United States Patent [19]

Brünig et al.

[11] 4,190,289

[45] Feb. 26, 1980

[54] NET HEADREST

[76] Inventors: Matthias M. Brünig, Parchimer Strasse 23, 2000 Hamburg 73; Herbert D. Stolle, Ruebenkamp 148, 2000 Hamburg 60, both of Fed. Rep. of Germany

[21] Appl. No.: 890,109

[22] Filed: Mar. 27, 1978

[30] Foreign Application Priority Data

Apr. 2, 1977 [DE] Fed. Rep. of Germany ....... 2714796
Jan. 23, 1978 [DE] Fed. Rep. of Germany ....... 2802850

[51] Int. Cl.² ............................................. A47C 1/10
[52] U.S. Cl. .................................... 297/391; 280/749
[58] Field of Search ....................... 297/391, 397–400; 280/748, 749, 751

[56] References Cited

U.S. PATENT DOCUMENTS

| 344,248 | 6/1886 | Cawley | 297/399 |
| 2,613,731 | 10/1952 | Roginski | 297/399 |
| 3,172,702 | 3/1965 | Rose | 297/397 |
| 3,645,556 | 2/1972 | Kobori | 297/397 UX |

*Primary Examiner*—James C. Mitchell
*Attorney, Agent, or Firm*—Nolte & Nolte

[57] ABSTRACT

A headrest for a seat of a motor vehicle and the method of making it are disclosed. The headrest is comprised of a frame attached to the seat and a net fastened to the frame.

9 Claims, 13 Drawing Figures

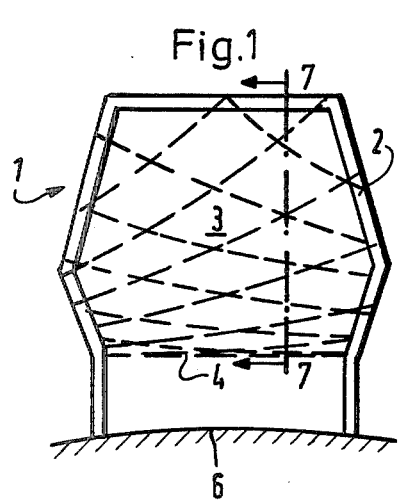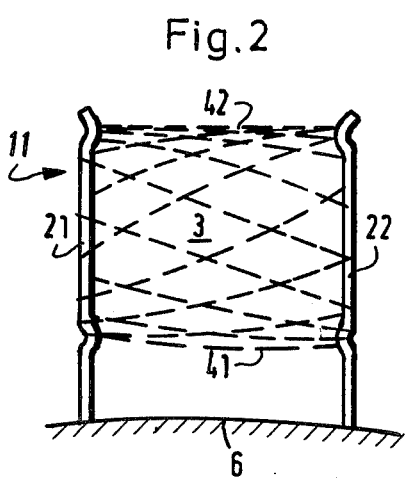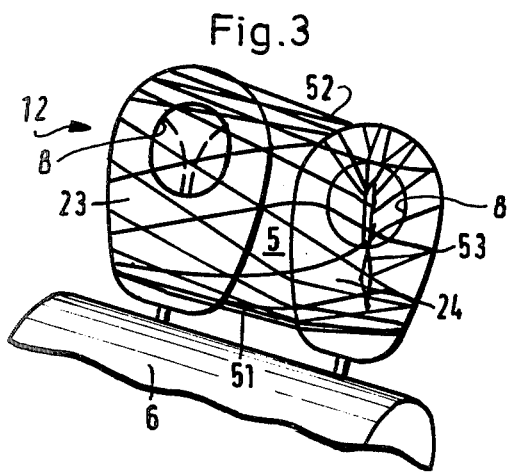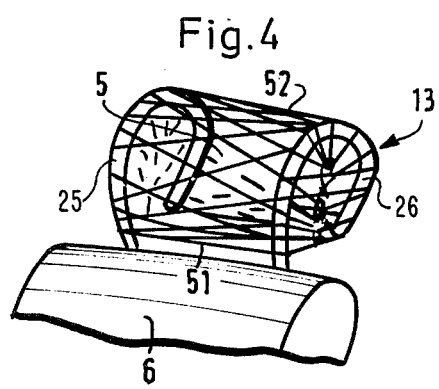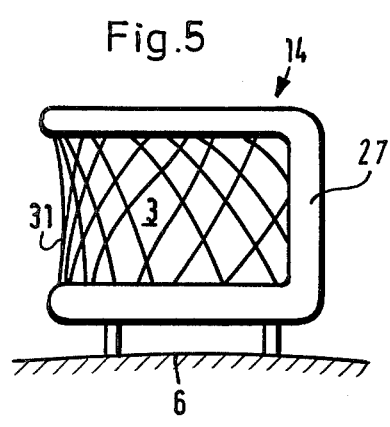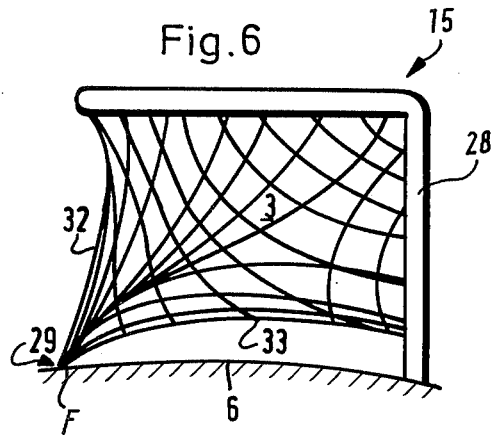

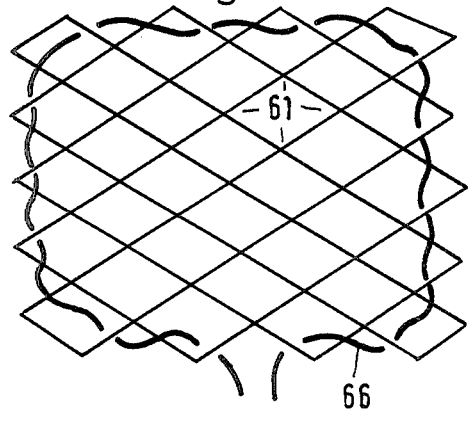
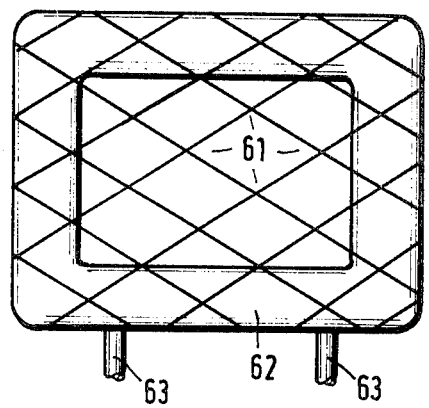
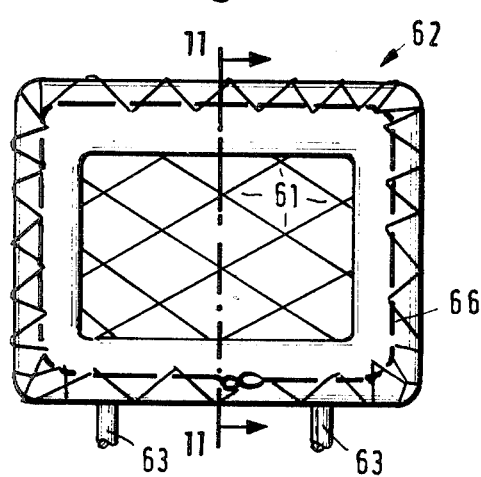
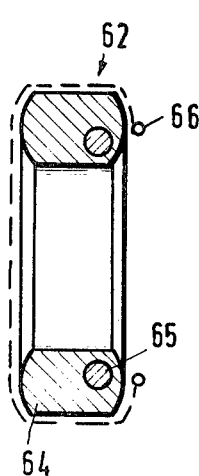
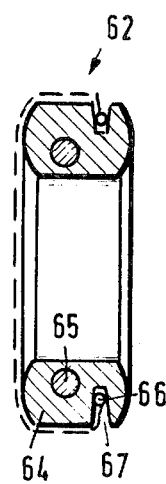
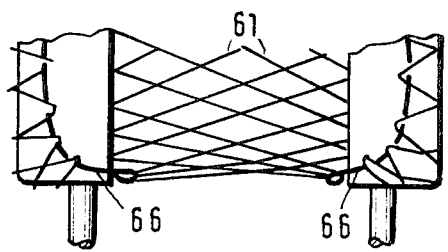

NET HEADREST

BACKGROUND OF THE INVENTION

Certain requirements have to be met regarding the nets of net headrests so that they offer the desired protection for the head of a driver upon impact, without injuring it. The net must be flexible and at the same time sufficiently under tension, so that the movement path of the head is terminated after a certain deformation of the net.

In known solutions of net headrests for automobile seats, a net was placed over a frame and fastened to the frame. In order to avoid injuries to the driver caused by the frame, the frame was covered with padding.

In the case of one known net headrest for automobile seats with a net stretched by a frame, preferably one having the form of a U-shaped bracket, which can be attached to the seat or which is rigidly connected therewith, at least the approximately vertical sides of the frame are provided with a padding and a pouch shaped net is placed over the same and stretched. Due to the necessary padding of the frame, part of the desirable rear view visibility and about the headrest areas forwardly was lost. Furthermore, it is no simple task to design th known net headrest in such a manner that the previously enumerated requirements are satisfactorily met. For instance, in the known net headrest it became evident that a contractible band is required in the lower region of the net (in the area of the open side of the U-shaped frame), which band had to be laboriously threaded through the loops of the net, or an additional padded rod had to be installed which obstructed the view and endangered the cervical vertebra.

THE INVENTION AND ITS OBJECTS

It is an object of the invention to provide a net headrest of the previously mentioned type, but with which the driver's view is less impeded, and the net, nevertheless, has sufficient rigidity. In this last respect, it is an object of the invention to provide such a net headrest having more rigidity in the region of the edge of the net than in other areas of the net; i.e. it should limit the movement of the driver's head at this spot, after a relatively minor deformation of the net, without requiring a strut or rod in this region.

According to the invention, a net headrest of the type described is characterized by the fact that the frame is open on at least one side and the net in the edge area of the open side of the frame is kept under high tensile stress, in comparison to the remaining net surface. Due to the stretching of the net in the pertinent marginal or edge area, the meshes of the net assume in this area a longitudinal shape extending through a relatively small surface area, whereas they have a more or less square or rhombic shape in a relatively large area in other parts of the net. If the head of a driver hits the marginal area, the head is stopped after a relatively short path of movement, as a result of the tensile stress effective in the net, whereas the head may have to cover a relatively long path in the remaining area of the net. However, no injury is sustained by the head in the marginal area which is under tensile stress, since it does not make contact with a strut or rod. On the other hand the driver is assured good rear view visibility, in comparison to a net headrest with a closed frame.

According to another embodiment of the invention, the frame consists of two vertical rods or other shaped props, and the net is kept under higher tension in the upper and lower regions, in comparison to the remaining net surface. This type of embodiment requires rigid, opaque parts only on both sides of the net headrest, whereas the upper and lower regions are completely free of such parts, which is important particularly in view of the fact that a motor vehicle is driven, according to experience, by persons of different size, i.e. persons of different head level in relationship to the seat of the motor vehicle. The rigid parts in the upper and lower regions of the net headrest, which are necessary in known net headrests, are replaced in the present invention by the net under tensile stress with regard to its function in case of head impact. Even if the two vertical rods or props have to be ultimately covered by padding, an improved view through the net headrest can be observed, in comparison to known net headrests.

According to another embodiment, the props are designed as flexible plates over which the net is stretched in the form of a pouch or bag and where it is retained, in the upper region (the region of the bottom of the pouch or bag) and in the lower region (the region where the pouch or bag is open) under higher tension in comparison to the remaining surface of the net. For this embodiment of a net headrest, a prefabricated net pouch may be used which is placed over the props, arranged at a distance to each other. The pouch or bag is made to assume the desired shape contingent upon the shaping of the props and of the net in that the desired localized tensile stresses are made to occur in the desired areas. In this type of embodiment, the meshes in the lower region are made to be tight so that they assume a longitudinal shape with small mesh surface and they may also be made to assume such a shape in the upper region so that these areas assume, with regard to function, the effect of rigid props, without impeding, however, the transparency of the net headrest and without danger of injuries to the head of the driver if his head hits the net headrest with relatively great speed. In designing the net to stress the upper region of the pouch or bag, it is taken into consideration that the lateral meshes must be capable of absorbing vertical forces or a vertical band has to be attached laterally for the absorption of these forces.

According to yet another embodiment of the invention, the surfaces of the plates may be formed uninterrupted or perforated so that its production is simplified and the good visibility through the net headrest is further enhanced. The horizontal cross section of the "plates" may be elliptical with the large axes in the driving direction, the total form of each plate being an ellipsoid.

In another embodiment of the invention, the vertical props of the headrest are designed in the form of a wire bracket. The production of the props of the net headrest can thus be simplified by merely bending a metallic, padded tube into the desired shape, such as arc-shaped and by then placing the net pouch or bag over these arc-shaped parts.

According to another embodiment of the invention, the frame consists of two parts affixed to each other at an angle, the net is held on the frame and on the seat, at the end opposite the vertex of the angle, under higher tension in the marginal areas of the net between the fastening point on the seat and on the frame. In this type of embodiment, the net is fastened to two sides of the frame, whereas the remaining sides are fastened to the seat of the motor vehicle in such a manner that a net surface of approximately rhombic shape is formed, whereby the marginal areas from the fastening point to the outer ends of the sides of the frame are under relatively high tensile stress and thus assume the same function as the metallic or rigid props. Through this type of embodiment, the frame which is metallic, or in any event hard, is limited to relatively few parts, so that the danger of injury decreased and the visibility about the net headrest is increased, at the same time. The open part of the headrest which has no frame faces preferably into the interior of a vehicle, if the headrest is fastened to the seat.

According to another embodiment of the net headrest according to the invention, the frame has a U-shaped design. In such an embodiment the frame can be arranged in such a way that the U-shaped frame is open on that side past which a driver normally looks back, whereas the base of the U-shaped frame is arranged on the other side, preferably in an area where a blind angle cannot be prevented in any case when looking backwards.

The invention further relates to the method of joining the nets or of fastening a part of the net to a frame. All methods used for this purpose up to now have the disadvantage that they are relatively time consuming and difficult to carry out. According to the invention, the fastening of the individual parts of the net used for the formation of a net pouch or bag to the frame is done by riveting, using the hollow type rivets, whereby the parts of the net which are to be fastened to each other are placed between the parts of a hollow type rivet connection and whereby the two hollow type rivet parts are pressed one into the other. Relatively small forces are necessary for this purpose, so that the meshed strands or threads do not become damaged. In the case of particularly sensitive net threads, plastic supporting disks, washers, or strips can be used for pressing and as part of the headrest structure when completed. As a result of the hollow type rivet connection, the manufacturing process is simplified, and in addition, a higher degree of rigidity is achieved in comparison to the knotted or sewn connection of the prior art, since the strands of the mesh loops place themselves smoothly around the round hollow type rivet parts, instead of being broken by sharp edged yarns or similar material. Even hollow type rivet seams in which only every third loop is riveted have, according to the actual test measurements, higher rigidities than seams formed through sewing.

In FIGS. 1 to 13 different samples of embodiments of net headrests according to the invention are illustrated somewhat diagrammatically.

FIG. 1 is a front view of a net headrest of the invention mounted on top of the partially shown seat of a motor vehicle.

FIG. 2 is a similar view of a net headrest, minus the top cross member shown in FIG. 1.

FIG. 3 is a perspective view of a modified form of the invention with a bag or pouch bridging the space between the two side members.

In FIG. 4 there is shown another perspective view illustrating a modified side member construction.

FIG. 5 is a front view of a three-sided embodiment.

FIG. 6 is a similar view of a further embodiment, namely a two-sided net headrest.

FIG. 7 is a diagramatic cross section taken along the line 7—7 of FIG. 1.

FIG. 8 illustrates the manner in which an auxiliary draw string tensioning means may be woven into the headrest netting.

FIG. 9 is a front view of a rectangular netted headrest with a padded frame.

FIG. 10 is a rear view of the headrest of FIG. 9 with the draw string of FIG. 8 in place thereon.

FIGS. 11 and 12 are cross sections along the line A–B of FIG. 10, wherein the draw string may be positioned outside (FIG. 11) or nested within (FIG. 12) the headrest frame; and FIG. 13 is a partial broken view, as seen from behind, of a net headrest according to the present invention, in which the lower transverse prop or bar is replaced by stretching the lower marginal meshes of the net.

FIG. 1 shows a net headrest 1 consisting of a frame 2 of bent wire or tubing and a net part 3 stretched over the same. The frame 2 is fastened to a partially shown seat 6 of a motor vehicle. The net 3 is fastened to the frame 2 in such a manner that an area 4 with relatively high tensile stress is created in the lower region between the two frame-halves, which is illustrated in FIG. 1 by the longitudinal meshes (loops or stitches) lying very close to each other.

FIG. 2 shows a net headrest 11 in which the frame consists of two vertically oriented props 21 and 22. Between the props 21 and 22 the net 3 is stretched in such a manner that marginal areas 41 and 42 with relatively high tensile stress develop in the lower, as well as in the upper region.

FIG. 3 shows a net headrest 12 which consists of two frame parts 23 and 24 which are identical to each other. Placed over these two frame parts 23 and 24 is a net pouch or bag 5 in such a way and manner that net areas with relatively high tensile stress develop in its lower region 51 and upper region 52. In order to increase visibility, the frame parts are provided with openings 8. For the absorption of the vertical forces, the meshes (loops or stitches) are laterally gathered up, as shown in 53.

FIG. 4 shows a net headrest 13 which consists of two pieces 25 and 26 made of bent tubing or wire over which a net pouch (bag) 5 has been pulled in the same manner as discussed with reference to the pouch of FIG. 3, so that the lower region and the upper region form net areas 51 and 52 of higher tensile stress.

The net headrest 14 shown in FIG. 5 consists of an essentially U-shaped frame 27 to the web and legs of which a net 3 is attached in such a manner that on the open side of the frame 27 a net area 31 with relatively high tensile stress is formed. The marginal area 31 faces generally towards the interior of the vehicle, if the net headrest is fastened to the seat.

The net headrest 15 shown in FIG. 6 consists of an angular frame part 28, on the sides of which a net 3 is fastened. In addition, the net 3 is also fastened by any conventional means, only shown diagrammatically at F, to the partially illustrated seat 6 at the point 29, so that two marginal areas 32 and 33 are formed in the net 3 in which a relatively high tensile stress is present. The marginal area 32 faces generally towards the interior of the vehicle.

The nets or the net bags can be fastened to the frame in such a manner that mesh loops are fastened to each other by means of hollow type rivets. In this manner, it is relatively simple to gather the mesh material and rivet gathered portions together to produce the areas or regions of higher tensile stress. Of course, it is also possible to use other forms of fastening, for instance, by hooking net meshes into hooks provided on the frame, or by similar means.

The marginal areas of the net which are under increased tensile stress can be further improved, as far as their rigidity and appearance is concerned, by means of rolling them in slightly, as shown at 4 in FIG. 7, which is a diagrammatic cross sectional view along lines 7—7 of FIG. 1.

FIGS. 8 to 11 show a net 61 which has diagonally placed meshes in relation to a frame 62 (FIGS. 9 to 11) of the net headrest. In FIG. 8 we can see how a tie string 66 is guided through certain meshes of the net 61 so that the string 66 runs essentially in a rectangular form.

The frame is essentially a rectangular frame of known design which can be connected with the seat of the motor vehicle by means of rods 63. The frame consists essentially of a padding 64 made of flexible material (foam material, for instance) and of a nucleus 65 of non-flexible rigid material.

In FIG. 10, the course of the tie string 66 is illustrated after the ends of the string have been knotted with each other, so that the net is stretched through the knotting process.

The string itself can be so arranged on the reverse side of the frame 62 so that it cannot be seen from the front as best seen in FIG. 11, which is a cross sectional view taken along the line 11—11 of FIG. 10. In this type of embodiment, the reverse side of the padding 64 can be covered by a shield (hood) made of plastic material or the like.

In a modified embodiment (FIG. 12, which is a cross sectional view similar to FIG. 11) of a net headrest according to the invention, the string 66 has been inserted into a recess 67 of the padding 64. For this type of embodiment, the reverse side of the frame 62 need not be covered; however, it is possible to provide the recess 67 with an appropriate cover.

During the production or the assembly of a net headrest according to the invention, the string 66 is threaded through the meshes or loops of the net in the form of a rectangle. Thereafter, the net is stretched and the ends are connected or knotted with each other. With the help of this simple working process, the net can be securely fastened to the frame of the net headrest and a sufficient tension of the net can be achieved.

The described type of fastening is particularly suitable for net headrests in which the lower transverse prop is replaced by tensioning by stretching the lower marginal meshes of the net. FIG. 13 shows the lower part of such a headrest, as seen from behind. The string 66 is knotted to the corner meshes of the net under tension, or it may be fastened by other known means.

A corresponding formation of the upper edge of the net headrest lies also within the framework of the present invention.

What is claimed is:

1. A net headrest for a seat of a motor vehicle, with a frame attached to the seat and a net fastened to the frame, characterized by the fact that the frame is closed at least at the top and open on at least one side or the bottom and the net in the marginal area of the open side or the bottom of the frame is kept under high tensile stress, in comparison to the remaining net surface.

2. The net headrest according to claim 1, further characterized by the fact that the frame is open only at the bottom.

3. The net headrest according to claim 1, characterized by the fact that the frame is open only on one side.

4. The net headrest according to claim 1, characterized by the fact that the frame is open only at the bottom and on one side.

5. The net headrest according to claim 1, characterized by the fact that the frame comprises a pair of spaced vertical props connected at their upper ends by a horizontally disposed cross piece out of contact with the seat and the vertical props and cross piece are designed in the form of padded elongated frame means over which the net in the form of a bag is stretched and retained in the upper region, which is the region of the closed end of the bag, and in the lower region, which is the region of the open end of the bag, being under high tension in comparison to the remaining surface of the net.

6. The net headrest according to claim 1, characterized by the fact that the frame consists of two parts affixed to each other at an angle and that the net is retained on the frame and on the seat, at the end opposite the vertex of the angle, under higher tension in the marginal areas of the net between the fastening point on the seat and on the frame.

7. A net headrest according to claim 1, characterized by the fact that the frame is C-shaped.

8. The net headrest according to claim 1, characterized by the fact that the edge of the net which is under higher tension is also rolled.

9. A net headrest according to claim 1 characterized by the fact that the frame has a top but no bottom, and only one side.

* * * * *